US009398532B2

(12) United States Patent
Hsu et al.

(10) Patent No.: US 9,398,532 B2
(45) Date of Patent: Jul. 19, 2016

(54) LONG PAGING CYCLE AND PAGING ENHANCEMENT FOR POWER SAVING LTE DEVICES

(71) Applicant: MEDIATEK INC., Hsinchu (TW)

(72) Inventors: Chia-Chun Hsu, New Taipei (TW); Per Johan Mikael Johansson, Kungsangen (SE)

(73) Assignee: MEDIATEK INC., Hsinchu (TW)

( * ) Notice: Subject to any disclaimer, the term of this patent is extended or adjusted under 35 U.S.C. 154(b) by 159 days.

(21) Appl. No.: 14/273,886

(22) Filed: May 9, 2014

(65) Prior Publication Data

US 2014/0334366 A1 Nov. 13, 2014

Related U.S. Application Data

(60) Provisional application No. 61/821,801, filed on May 10, 2013.

(51) Int. Cl.
*H04W 52/02* (2009.01)
*H04W 68/02* (2009.01)
(Continued)

(52) U.S. Cl.
CPC ...... *H04W 52/0225* (2013.01); *H04W 36/0072* (2013.01); *H04W 48/20* (2013.01); *H04W 52/0216* (2013.01); *H04W 68/02* (2013.01); *H04W 76/048* (2013.01); *Y02B 60/50* (2013.01)

(58) Field of Classification Search
CPC ............ H04W 52/0225; H04W 48/20; H04W 52/0216; H04W 36/0072; H04W 68/02; H04W 52/02; H04W 52/0209; H04W 8/16
USPC .................................................. 370/311, 329
See application file for complete search history.

(56) References Cited

U.S. PATENT DOCUMENTS

| 6,377,803 B1 | 4/2002 | Ruohonen | 455/434 |
| 2006/0194549 A1* | 8/2006 | Janik | G06F 17/30749 455/73 |

(Continued)

FOREIGN PATENT DOCUMENTS

| CN | 101690348 A | 5/2007 |
| CN | 101534544 A | 3/2008 |

(Continued)

OTHER PUBLICATIONS

USPTO, Office Action for related U.S. Appl. 14/273,857 dated Nov. 30, 2015 (10 pages).

(Continued)

*Primary Examiner* — Kwang B Yao
*Assistant Examiner* — Syed M Bokhari
(74) *Attorney, Agent, or Firm* — Imperium Patent Works; Zheng Jin; Mark Marrello

(57) ABSTRACT

An enhanced paging mechanism is provided for UEs waking up from a very long paging cycle to improve paging robustness and flexibility. Enhanced paging includes absolute time paging (ATP) and paging with extended wakeup time. For absolute time paging, a UE receives ATP configuration and uses the actual wall time to calculate paging occasion if a condition is satisfied. In one embodiment, the wall time is acquired from at least one of an internal UE clock, a GPS time, information broadcasted from the network, or information from a higher layer signaling. For paging with extended wakeup time, a UE applies a long paging cycle followed by multiple normal paging cycles after waking up from the long paging cycle. In one embodiment, the long paging cycle is infinite and the UE enters normal paging cycle only upon TAU-triggered paging or uplink traffic.

22 Claims, 8 Drawing Sheets

(51) Int. Cl.
*H04W 36/00* (2009.01)
*H04W 48/20* (2009.01)
*H04W 76/04* (2009.01)

(56) References Cited

U.S. PATENT DOCUMENTS

| | | | |
|---|---|---|---|
| 2008/0232310 A1* | 9/2008 | Xu | H04W 52/0216 370/329 |
| 2009/0258661 A1 | 10/2009 | Tsai | 455/458 |
| 2010/0110897 A1 | 5/2010 | Chun et al. | 370/241 |
| 2010/0184458 A1 | 7/2010 | Fodor et al. | 455/522 |
| 2011/0130100 A1 | 6/2011 | Chen et al. | 455/67.11 |
| 2011/0195709 A1 | 8/2011 | Christensson et al. | 455/426.1 |
| 2011/0269462 A1 | 11/2011 | Sägfors | 455/436 |
| 2012/0115552 A1* | 5/2012 | Bhattacharya | H04W 52/0261 455/574 |
| 2012/0275366 A1* | 11/2012 | Anderson | H04W 52/0219 370/311 |
| 2013/0265922 A1* | 10/2013 | Chakravarthy | H04W 52/0212 370/311 |
| 2014/0329550 A1* | 11/2014 | Diachina | H04W 68/02 455/458 |

FOREIGN PATENT DOCUMENTS

| | | |
|---|---|---|
| CN | 102083110 A | 11/2009 |
| CN | 102754500 A | 2/2010 |
| CN | 102724720 A | 6/2012 |
| EP | 2120504 A1 | 4/2008 |
| GB | 2483752 A | 8/2011 |

OTHER PUBLICATIONS

EPO, Search Report for the EP patent application 14794398.9 dated Jan. 13, 2016 (7 pages).

3GPP TSG RAN WG2 Meeting #81bis R2-130996, CATT, Considerations on UEPCOP, Chicago, U.S.A. dated Apr. 15-19, 2013 (4 pages).

3GPP TR 23.887 V0.9.0 (Apr. 2013), 3rd Generation Partnership Project; Technical Specification Group Services and System Aspects; Machine-Type and Other Mobile Data Applications Communications Enhancements (Release 12).

EPO, Search Report for the EP patent application 14795068.7 dated Dec. 15, 2015 (6 pages).

International Search Report and Written Opinion of International Search Authority for PCT/CN2014/077255 dated Aug. 19, 2014 (13 pages).

International Search Report and Written Opinion of International Search Authority for PCT/CN2014/077265 dated Aug. 19, 2014 (11 pages).

* cited by examiner

METHOD OF ENHANCED CELL RESELECTION

METHOD OF PAGING ENHANCEMENT

LONG PAGING CYCLE AND PAGING ENHANCEMENT FOR POWER SAVING LTE DEVICES

CROSS REFERENCE TO RELATED APPLICATIONS

This application claims priority under 35 U.S.C. §119 from U.S. Provisional Application No. 61/821,801, entitled "Super Long DRX for Power Saving LTE Device," filed on May 10, 2013, the subject matter of which is incorporated herein by reference.

TECHNICAL FIELD

The disclosed embodiments relate generally to mobile communication network devices, and, more particularly, to UE enhancement for power consumption optimization.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station.

Despite the improvements in the LTE system, it still faces capacity and efficiency problems with the rapid growth of different mobile users. Specifically, UEs in the mobile network face increasing problems of power efficiency. Power consumption is important for UEs that are powered by battery and for UEs that are using external power supply. The importance increases with the continued growth of device population and more demanding use cases. The rapid uptake of Smartphone subscribers and the launch of different types of mobile devices such as machine type communication (MTC) devices creates additional challenges for power efficiency.

For Machine-to-Machine (M2M) use cases, sensor-like devices with modems run on batteries, the cost of exchange or charge the batteries for a large amount of devices is too high to be accommodated. The battery lifetime may determine the devices lifetime or the network lifetime. From a wide range of applications (e.g., Smartphone Apps or MTC applications), UE battery life also becomes a major concern. A considerable number of applications show traffic patterns that cost unnecessary power consumption, because many of the background applications and background traffic are not optimized for power consumption. Even for scenarios where UEs may consume power from an external power supply, it is still desirable to consume less power for energy efficiency purpose.

Optimization for UE power consumption is thus required with the increased popularity of various mobile applications. The LTE system has introduced discontinuous reception (DRX) in both connected state and idle state. In general, long DRX cycle helps to improve UE battery life and to reduce network signaling overhead. However, long DRX cycle also creates potential issues for LTE systems. UEs in idle state are required to wake up periodically to monitor paging channel (PCH) for downlink data. For some services or devices, current paging cycle is too short and therefore not power optimized. The current maximum DRX cycle for a LTE device is 2.56 second, i.e. a UE wakes up for one millisecond every 2.56 second. If the current way of calculating paging occasion does not change, then the paging cycle extension is limited by System Frame Number (SFN) wrap around, which is 10.24 second. Longer than that, the current way of calculating paging occasion does not work.

Another issue is that a very long sleep cycle may affect UE mobility. When a UE is in long sleep cycle, it does not perform mobility measurements. The UE only performs measurements for mobility evaluation at each wakeup. The network thus ends up with less accurate measurement to make assistance efficiently in preparing handover for the UE. Furthermore, with a DRX cycle in the magnitude of minutes, it is likely that cell reselection does not work and cannot be used. This is because the UE is likely to have moved a long distance and away from the coverage of the originally camped cell. When the UE wakes up for paging, the stored cell reselection parameters for the previous cell are no longer applicable. As a result, the UE has to do cell selection. To implement network policy and limit the effort of full scanning, it is desirable for the network to still be able to provide cell reselection parameters that are valid in a wider area for these UEs with long sleep cycle.

Another potential issue of long sleep cycle is paging robustness, because paging occasions are non-synchronized between cells. This means that when a UE wakes up and is out of coverage of its originally camped cell, the UE needs to camp on a new cell to receive paging there, and wait (in sleep mode) for paging there. For a faster moving UE that changes coverage cells many times during sleep, the result may be that the wakeup time for paging is always wrong, i.e. the UE calculates its paging occasion based on the parameters of the old camped cell for which the UE is no longer in the coverage when it wakes up. Even for a UE that does not change cell very often, very long sleep also results in clock drift and risks of missing pages due to monitoring paging at wrong timing. In addition, if the paging cycle is very long, a longer wakeup session is expected since the UE may need to go through a longer preparation. For example, timing drift may be up to one second for long paging cycle, thus one millisecond wakeup time is not sufficient for UE to prepare for synchronization. In general, if paging cycle is extended up to ~10 second, it seems feasible to just extend the current paging mechanism. However, if paging cycle is extended to the magnitude of minutes or more, then it seems that the impact is much bigger. A new paging mechanism is desired to improve the robustness and flexibility of paging.

SUMMARY

In LTE systems, long paging cycle helps to improve device battery life and to reduce network signaling overhead. In the present invention, enhanced cell reselection procedure and enhanced paging mechanism are proposed when a user equipment (UE) is configured with very long paging cycle.

In a first novel aspect, a method of cell reselection enhancement is proposed. A UE obtains parameters for extended cell reselection (ECR) in a mobile communication network. The UE goes to sleep and then wakes up periodically to monitor a paging channel. The UE either applies a normal paging cycle having a normal paging cycle length or applies a power-saving paging cycle having a very long paging cycle length. The UE performs cell selection if normal paging cycle is applied. The UE performs cell reselection based on the ECR parameters if the power-saving paging cycle is applied, and if the ECR parameters are still valid based on a list of conditions. The network provides the ECR parameters for a wider area for UEs with long paging cycle such that the UE can still use cell reselection after waking up from the long sleep to reduce power consumption.

In one embodiment, the ECR parameters include absolute priorities of different E-UTRAN frequencies or inter-RAT frequencies, RAT offset, threshold for cell reselection to higher/lower priority RAN/frequency, cell reselection periodicity (Treselection) and mobility scaling factor, threshold of Stop-Measure criterion, maximum transmit power, and a black/white cell list. The conditions for validity of the ECR parameters include Cell IDs, tracking area(s), PLMN, timer, cell change count, distance, and physical location. The conditions can be predefined or acquired by the UE as part of the ECR parameters from higher layer, system info, dedicated signaling, or from other RAT.

In a second novel aspect, an enhanced paging mechanism is provided for UEs waking up from a very long paging cycle to improve paging robustness and flexibility. Enhanced paging includes absolute time paging (ATP) and paging with extended wakeup time. For absolute time paging, a UE receives ATP configuration and uses the actual wall time to calculate paging occasion if a condition is satisfied. The ATP configuration is based on UE capability and requirement. The condition for the validity of ATP may include a timer, a PLMN, or a TA. In one embodiment, the wall time is acquired from at least one of an internal UE clock, a GPS time, information broadcasted from the network, or information from a higher layer signaling.

For paging with extended wakeup time, a UE applies a long power-saving paging cycle followed by multiple normal paging cycles after waking up from deep sleep of the long paging cycle. The long power-saving paging cycle length is at least in the magnitude of minutes or more. The UE is considered power off at AS level and does not perform idle mode procedure during the deep sleep. The UE returns back to the long paging cycle from the multiple normal paging cycles after a condition is satisfied. In one embodiment, the condition comprises a timer and a maximum number of normal paging cycles. In another embodiment, the long paging cycle length is infinite and the UE enters normal paging cycle only upon TAU-triggered paging or uplink traffic.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
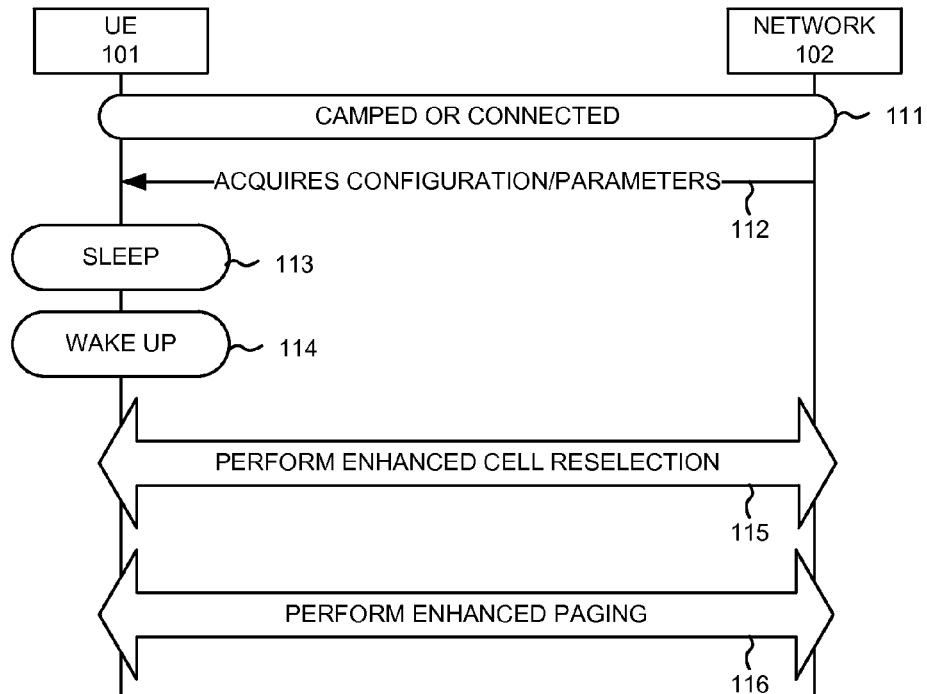
FIG. 1 illustrates a mobile communication network supporting enhanced cell reselection and enhanced paging in accordance with a novel aspect.

FIG. 1 illustrates a mobile communication network supporting enhanced cell reselection and enhanced paging in accordance with a novel aspect. In the example of FIG. 1, a mobile communication network 102 is an LTE network. In step 111, a user equipment UE 101 is camped on a cell in normal idle mode or has established an RRC connection with a serving base station in connected mode. In step 112, UE 101 acquires configurations and parameters from network 102. The configurations and parameters, for example, may be related to sleep mode operation and related to paging and cell reselection configurations and parameters. UE 101 may be configured with different sleep mode operation having different sleep cycles for both idle mode and connected mode.

In step 113, UE 101 goes to sleep based on a configured paging cycle. In step 114, UE 101 wakes up from the paging cycle to monitor a paging channel (PCH). For example, if UE 101 is in normal idle mode, then UE 101 may go to sleep for a configured normal paging cycle having a normal paging cycle length, and UE 101 wakes up periodically in normal idle mode to monitor the PCH. On the other hand, for power consumption and battery life purpose, UE 101 may be configured with power-saving paging cycle having a very long power-saving paging cycle length, e.g., in the magnitude of minutes or more. If UE 101 wakes up from deep sleep of the very long power-saving paging cycle, then various issues including UE mobility, cell reselection, and paging robustness may arise due to the very long paging cycle.

In one novel aspect, enhanced cell reselection procedure and enhanced paging mechanism are proposed when UE is configured with very long paging cycle for power-saving purposes. In step 115, UE 101 performs enhance cell reselection procedure upon waking up from a very long paging cycle. From both UE and network point of view, cell reselection is preferred than cell selection. However, current cell reselection is only valid in the neighbor cells of the previous camped cell. Therefore, if UE 101 has already left the neighborhood after the long sleep, then those cell reselection parameters would become obsolete. Accordingly, network 102 provides parameters for cell reselection that can be applied for a wider range of area. As a result, UE 101 still can perform cell reselection after a long deep sleep. This is referred to as "Extended Cell Reselection (ECR)".

In addition to cell reselection enhancement, enhanced paging mechanism is also desirable if UE 101 is configured with very long paging cycle. In step 116, UE 101 performs enhanced paging, which includes absolute time paging (ATP) and paging with extended wakeup time. If UE 101 is a faster moving UE that changes coverage cells many times during the long deep sleep, the wakeup time for paging may be always wrong, i.e. the UE calculates its paging occasion based on the parameters of the old camped cell for which the UE is no longer in the coverage when it wakes up. Even if UE 101 does not change cell very often, very long deep sleep also results in clock drift and risks of missing pages due to monitoring paging at wrong timing. Accordingly, UE 101 calculates paging occasion not based on the reference of the camped cell, but based on the actual time, e.g., wall time instead. As a result, if timing is synchronized between the network and the UE, then the chance of waking up at wrong timing after a long deep sleep is reduced.

Another paging enhancement is paging with extended wakeup time. The current wakeup time for idle mode UE is just one millisecond per paging cycle. If the paging cycle is very long, a longer wakeup session is expected since the UE is expected to go through a longer preparation. This is because timing is in general proportional to the duration of the paging cycle. For long paging cycle, timing drift may be up to one second, thus the one millisecond wakeup time is not sufficient for UE to prepare, e.g., synchronization. Accordingly, the UE can stay awake longer than the current requirement. The extended wakeup time also allows more flexibility on MME paging request and thus reducing the chance of missing paging and packet delay.

Figure 2:
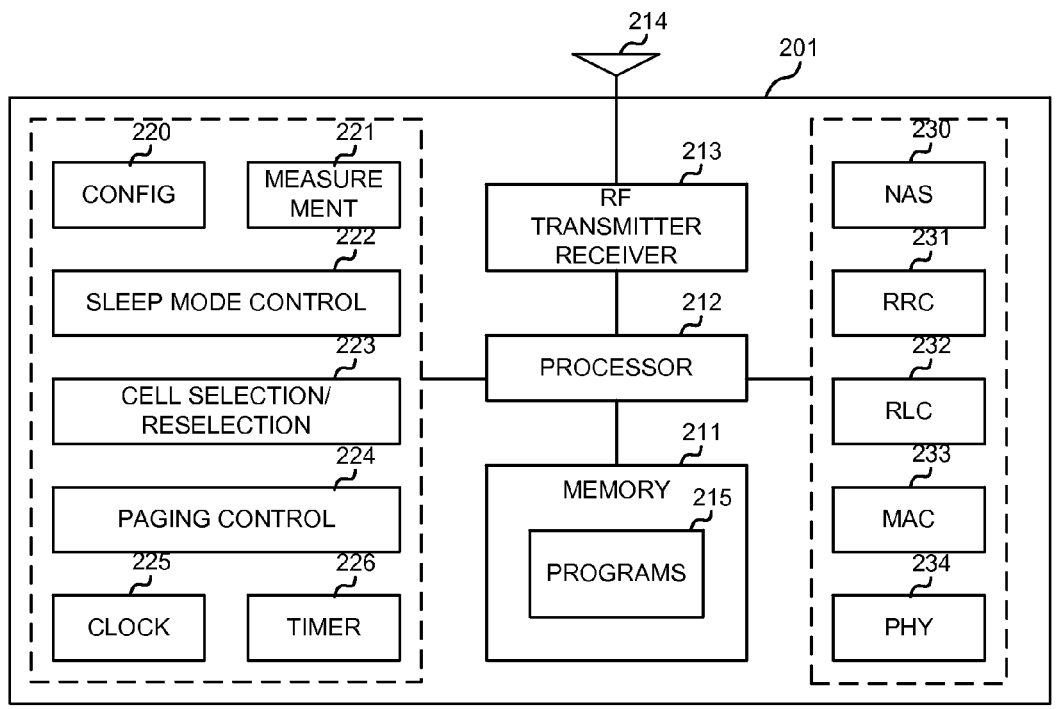
FIG. 2 illustrates an exemplary block diagram of a UE that supports embodiments of the invention.

FIG. 2 illustrates an exemplary block diagram of a UE 201 that supports embodiments of the invention. UE 201 comprises memory 211, a processor 212, a radio frequency (RF) transmitter and receiver module 213 coupled to antenna 214, and 3GPP protocol stack supporting various protocol layers including NAS 230, RRC 231, RLC 232, MAC 233, and PHY 234. In the transmitting direction, the transceiver converts received baseband signals from the processor to RF signals and sends out to the antennas. In the receiving direction, the processor processes the received baseband signals from the transceiver and invoke different functional modules to perform various features supported by the UE.

The different function modules include a configuration module 220, a measurement module 221, a sleep-mode control module 222, a cell selection and reselection module 223, a paging control module 224, an internal clock 225, and a timer 226. The function modules may be implemented by software, firmware, hardware, or any combination thereof. The function modules, when executed by processor 212 (via program instructions 215 contained in memory 211), interwork with each other to allow UE 201 to perform enhanced cell reselection and enhanced paging mechanism. For example, the configuration module receives parameters for ECR and configurations for ATP from the network, and configures the UE with different paging cycles. The sleep-mode control module enables the UE to go to sleep and to wake up from the paging cycles accordingly. The cell selection and reselection module performs extended cell reselection for UE after UE wakes up from long paging cycle. The paging control module enables the UE to perform enhanced paging that is more robust and more flexible.

Extended Cell Reselection (ECR)

Figure 3:
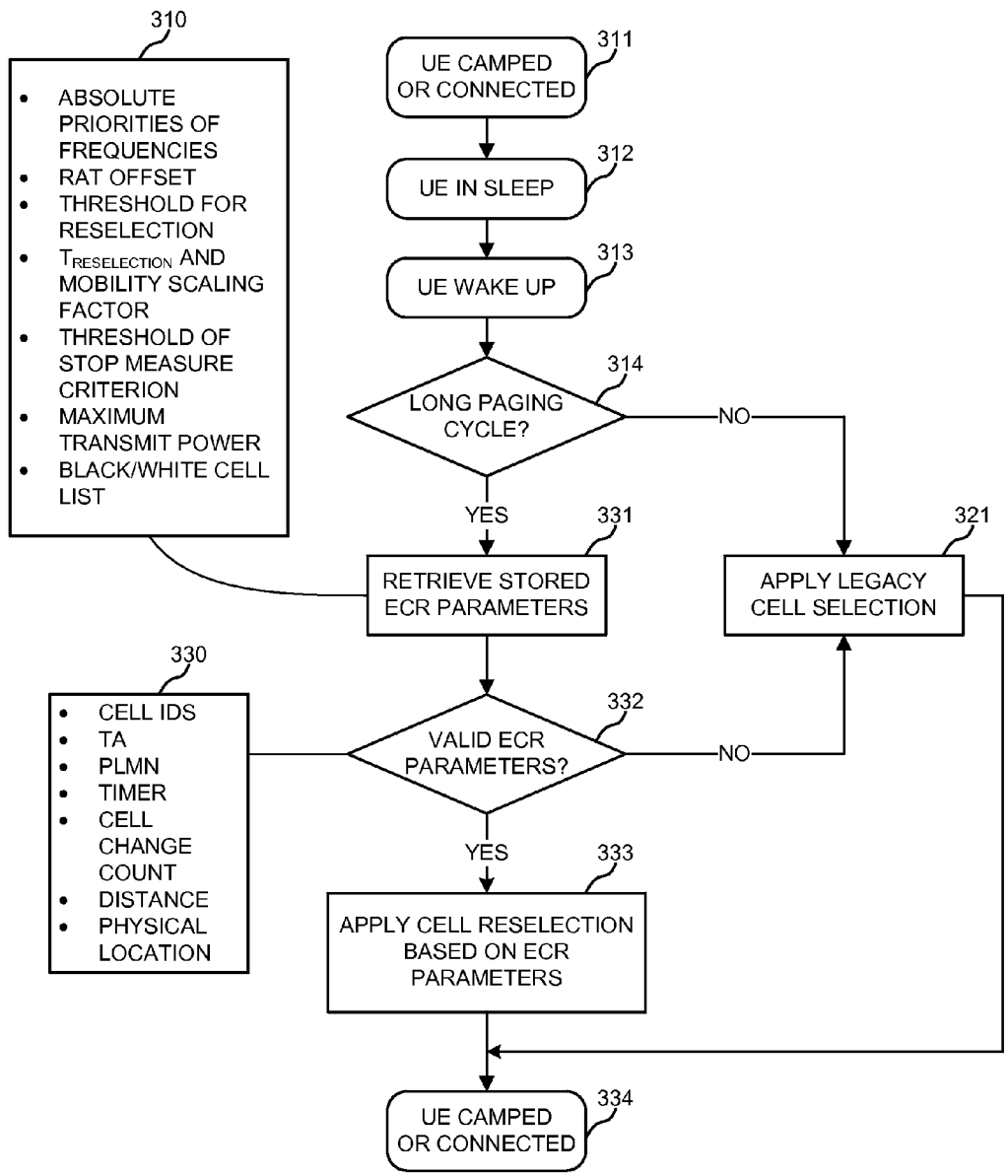
FIG. 3 illustrates a method flow of extended cell reselection in accordance with one novel aspect.

FIG. 3 illustrates a method flow of extended cell reselection in accordance with one novel aspect. In step 311, a UE is camped on a cell in normal idle mode or has established an RRC connection with a serving base station in connected mode. The UE is configured with a paging cycle, having a normal paging cycle length, or a very long power-saving paging cycle length. In step 312, the UE goes to sleep for the configured paging cycle length. In step 313, the UE wakes up from the paging cycle. In step 314, the UE determines whether it has slept for a very long paging cycle. If the answer is NO, then the UE applies legacy cell selection in step 321. The legacy cell selection procedure costs high power consumption, as it involves full scanning of possible frequencies to find the best suitable cell for the UE.

If the answer to step 314 is YES, then in step 331, the UE retrieves stored parameters for extended cell reselection (ECR). Cell reselection is a mechanism for UE to change cell after the UE is already camped on a cell. Based on configured cell reselection parameters, the UE uses certain criteria and algorithms for cell reselection process. In general, ECR parameters are used to define the certain criteria and algorithms for UEs after deep sleep for cell reselection purpose. The list of ECR parameters is depicted in table 310, and includes absolute priorities of different E-UTRAN frequencies or inter-RAT frequencies, RAT offset, threshold for cell reselection to higher/lower priority RAN/frequency, cell reselection periodicity (Treselection) and mobility scaling factor, threshold of Stop-Measure criterion, maximum transmit power, and a black/white cell list.

The absolute priorities define the priorities of different frequencies for scanning. Similarly, the RAT offset defines preferred RAT for cell reselection. LTE cell reselection is a priority-based process. A UE always measure frequencies and RATs with higher priority based on the absolute priorities and the RAT offset. As a result, the UE is able to find a preferred frequency as quick as possible and able to choose a preferred RAT based on network policy considerations such as traffic congestion and load balancing. The threshold for cell reselection refers to the criteria of determining a qualified cell during the cell reselection process. Treselection refers to how often a UE needs to perform cell reselection. Such periodicity may be scaled based on UE mobility. For example, a slow-moving UE may perform cell reselection every one second, while a fast-moving UE may perform cell reselection every half second. The Stop-Measure threshold refers to the criteria of when a UE may stop measurements searching for better cells. The maximum transmit power is related to cell reselection in terms of uplink power condition. Finally, the black/white cell list defines certain cells that a UE should avoid (black cell list) and should choose (white cell list).

In step 332, the UE determines the validity of the stored ECR parameters. Depending on how long the UE has slept, and how far the UE has moved during the sleep, those stored ECR parameters may not be valid because the UE may have slept too long, or have moved too far from its original location anticipated by the network for proper cell reselection purpose. The validity of the ECR parameter can be determined based on a list of conditions as depicted in table 330. In general, the conditions are related to defining a wider area where ECR parameters are still applicable for UEs after waking up from a very long deep sleep. The list of conditions include Cell IDs, tracking area(s), PLMN, timer, cell change count, distance, and physical location.

The Cell IDs (PCI, CGI, etc.) refer to a list of cells that belong to a predefined geographic area. As long as a UE camps or senses a cell in the list, then the ECR information is considered valid. The tracking area(s) (TAs) also defines a geographic area. As long as a UE does not change its TA or is still located within the TAs, then the ECR information is considered valid. The PLMN refers to a specific PLMN, i.e. as long as a UE spots the PLMN, then the ECR information is considered valid. The timer defines the expiration time of the ECR parameters. As long as the timer has not expired, the ECR information is considered valid. The cell change count refers to how often a UE changes cell. As long as the cell change count has not reached a certain threshold, the ECR information is considered valid. The cell change count threshold may be scaled by UE speed. For example, a faster moving UE may have a higher threshold. The cell change count is re-started if the newly camped cell also provides ECR information. The distance refers to the distance between the current UE location and the location where the ECR information is received by the UE. As long as the UE is within certain distance from the location where the ECR information is received, then the ECR information is still considered valid. Finally, the physical location defines a wider geographic area, i.e., as long as the UE is inside the defined wider geographic area, the ECR information is still considered valid.

If the answer to step 332 is NO, then the UE goes to step 321 and performs legacy cell selection. On the other hand, if the answer to step 332 is YES, then the UE goes to step 333 and performs cell reselection based on the stored ECR parameters. The cell reselection reduces UE power consumption because the UE does not need to perform full scanning. Instead, the UE only needs to perform limited scanning and measurements in order to camp on a new cell, based on the priorities and criteria provided by the ECR parameters. Finally, in step 334, the UE camps on the new cell or establishes a new connection in the new cell.

Figure 4:
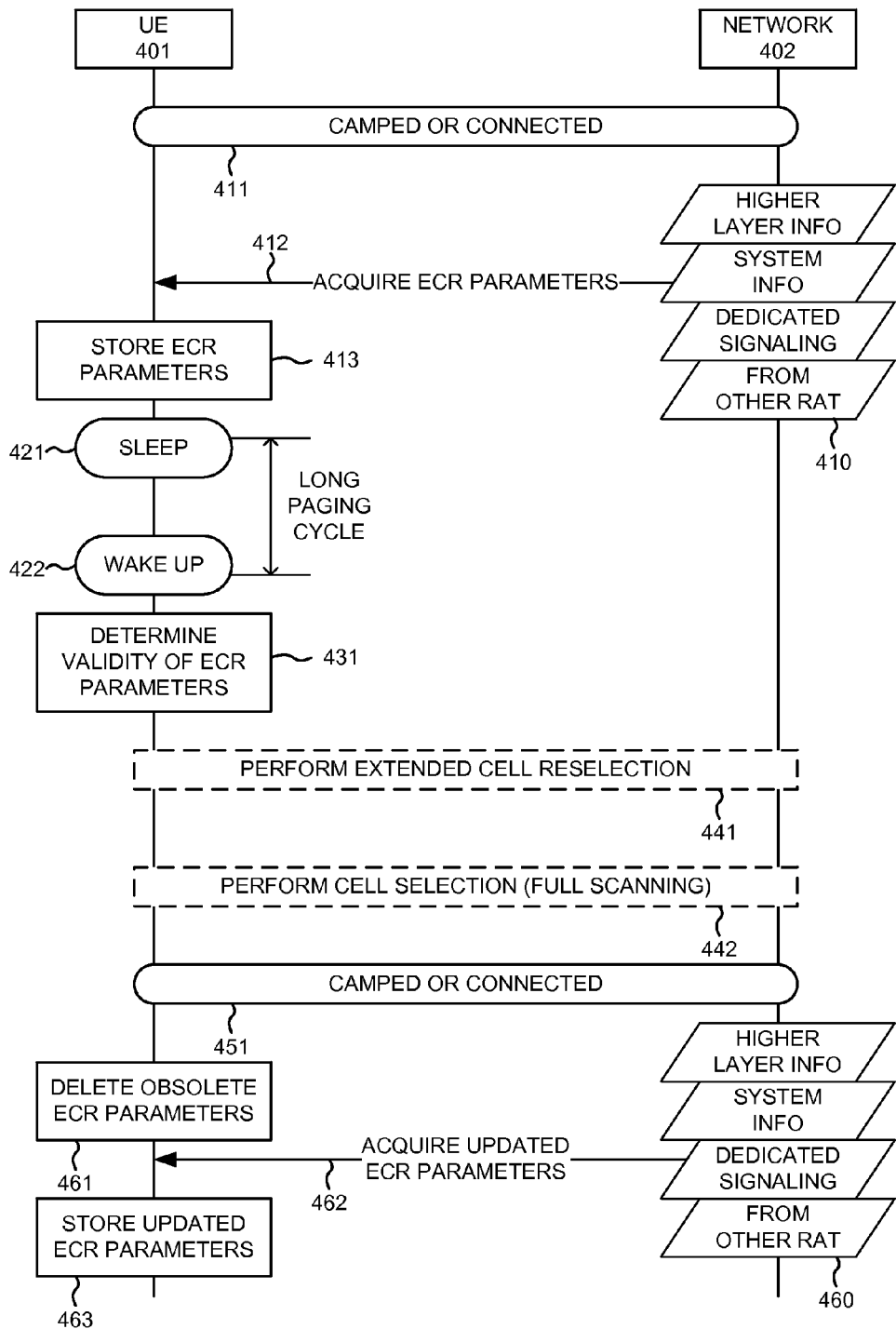
FIG. 4 illustrates a signaling sequence chart between a UE and network for supporting extended cell selection after UE waking up.

FIG. 4 illustrates a signaling sequence chart between UE 401 and network 402 for supporting extended cell selection after UE waking up from a long deep sleep. In step 411, UE 401 is camped on a cell in normal idle mode or has established an RRC connection with a serving base station in connected mode. In step 412, UE 401 acquires ECR parameters from network 402. As depicted by list 410, the ECR parameters may be acquired via different means. For example, network 402 can forward the ECR parameters for UEs using very long paging cycle before the UE leaves connected state via dedicated signaling, i.e., an RRC Connection Release message or a new RRC message. Alternatively, network 402 can broadcast ECR parameters as part of the system information (e.g., SIB) so that UE 401 can acquire the information when needed. UE 401 may inherit the ECR information from another RAT. The ECR information can also come from higher layer, e.g., non-access stratum (NAS)-layer singling from a mobility management entity (MME) or signaling from Open Mobile Alliance (OMA) Device Management (DM).

In step 413, UE 401 stores the acquired ECR parameters. Later on, UE 401 decides to go to sleep mode with a configured very long power-saving paging cycle. In step 421, UE 401 goes to deep sleep for the power-saving paging cycle length. In step 422, UE 401 wakes up from the very long paging cycle. In step 431, UE 401 decides to camp on a new cell and determines whether the stored ECR parameters are valid for extended cell reselection. If the answer is yes, then UE 401 performs extended cell reselection in step 441. ECR involves prioritized cell searching and thus reduces power consumption. Otherwise, UE 401 performs legacy cell selection in step 442. Legacy cell selection involves full scanning and consumers more time and power as compared to ECR. Finally, in step 451, UE 401 camps on a new cell or establishes a new connection in the new cell.

UE 401 keeps the ECR parameters as long as they are valid and replaces the ECR parameters when new values are available. In step 461, UE 401 deletes the obsolete ECR parameters if UE 401 determines that they are no longer valid. In step 462, UE 401 acquires updated ECR parameters from network 402. Similar to step 412, UE 401 may acquire the updated ECR parameters via various means as depicted by list 460. In step 463, UE 401 stores the updated ECR parameters.

Figure 5:
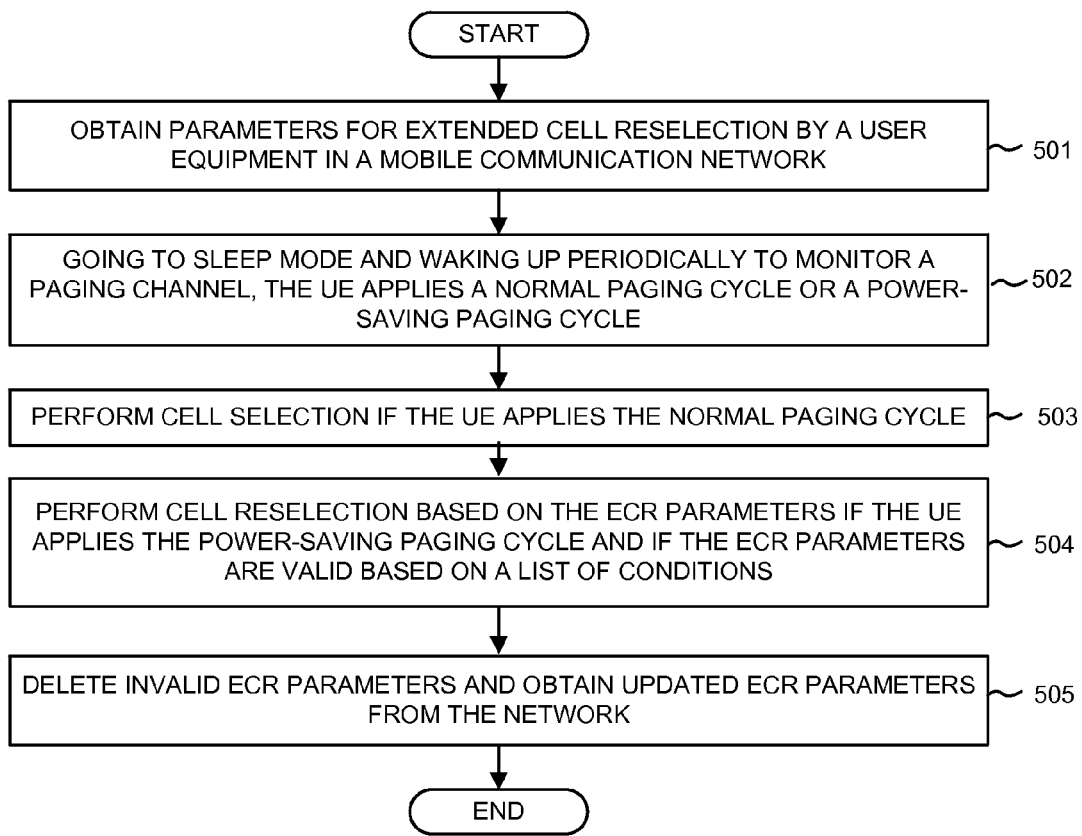
FIG. 5 is a flow chart of a method for extended cell reselection in accordance with one novel aspect.

FIG. 5 is a flow chart of a method for extended cell reselection in accordance with one novel aspect. In step 501, a UE obtains parameters for extended cell reselection (ECR) in a mobile communication network. In step 501, the UE goes to sleep and then wakes up periodically to monitor a paging channel. The UE either applies a normal paging cycle having normal paging cycle length or applies a power-saving paging cycle having a very long paging cycle length. In step 503, the UE performs cell selection if normal paging cycle is applied. In step 504, the UE performs cell reselection based on the ECR parameters if the power-saving paging cycle is applied, and if the ECR parameters are still valid based on a list of conditions. In step 505, the UE deletes obsolete ECR parameters and obtains updated ECR parameters from the network.

Enhanced Paging Mechanism

In addition to cell reselection enhancement, enhanced paging mechanism is also desirable after a UE waking up from a very long paging cycle. Enhanced paging includes absolute time paging (ATP) and paging with extended wakeup time.

Paging is a procedure for the network to transmit paging message to UEs in idle mode or EMM registered state. Paging message may be triggered by MME in core network or eNB in RAN. Paging information for a UE is being carried on the physical downlink shared channel (PDSCH) in the resource blocks indicated by the physical downlink control channel (PDCCH). Different group of UEs monitor different subframes (e.g., paging occasion) for their paging messages. For DRX operation in idle mode, a UE is allowed to monitor paging message discontinuously to save power. The UE goes to sleep and wakes up periodically to monitor its paging channel (PCH). A success paging reception requires the UE to decode PDCCH and PDSCH for the PCH message, which requires timing synchronization. Timing synchronization is not a problem if a UE wakes up after a short sleep. However, the problem becomes more serious when the sleep time becomes much longer. One way to guarantee the timing synchronization is to use ATP.

Figure 6:
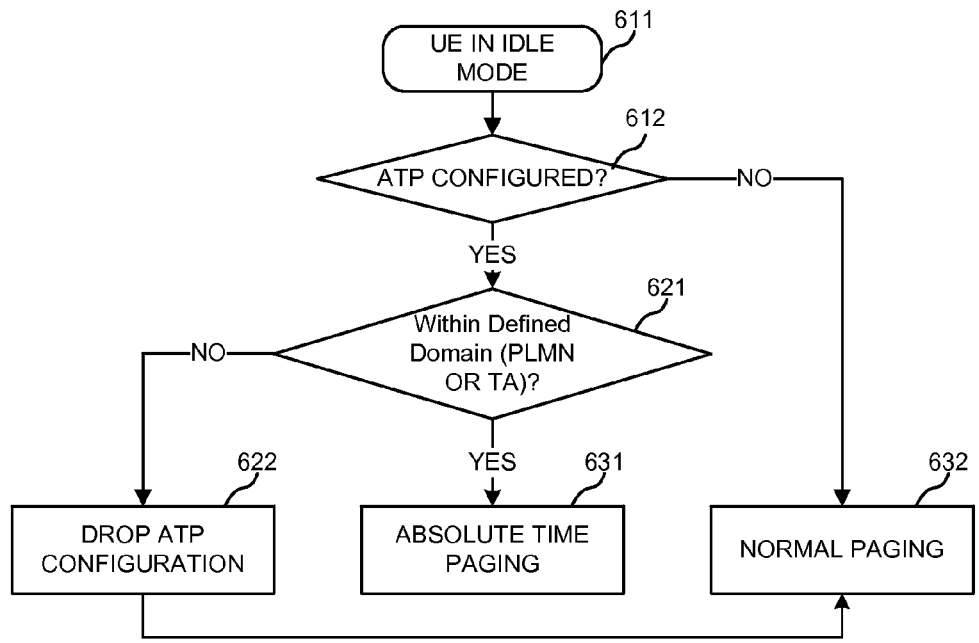
FIG. 6 illustrates a method flow of absolute time paging.

FIG. 6 illustrates a method flow of absolute time paging (ATP). In step 611, a UE is camped on a cell in normal idle mode. In step 612, the UE determines whether ATP is configured or not. If the answer is NO, then the UE stays in normal idle mode and wakes up periodically to perform normal paging in step 632. If ATP is configured, then UE determines whether a condition for ATP is satisfied or not in step 621. The validity of absolute time paging can be restricted by conditions, e.g., timer, PLMN, TA, etc. When the condition is not satisfied, then ATP is released, and the UE reverts to normal paging. The requirement for TAU may be different for legacy paging and ATP. For example, the UE may be registered to an additional TA when ATP is configured. Such configuration could reduce the need that a UE needs to do TAU after a long sleep. In the example of step 621, the UE determines whether it is within a defined domain, e.g., a PLMN or a TA. If the answer is YES, then the condition for ATP is satisfied, and the UE goes to step 631 for ATP. If the answer is NO, then the condition for ATP is not satisfied, and the UE drops ATP configuration in step 622 and goes to step 632 for normal paging.

Typically, paging occasion is calculated based on the reference of the camped cell. However, if the UE wakes up from a very long sleep, the UE might have moved away from the reference cell, and there is no guarantee that the timing is synchronized among different cells of different eNBs. Therefore, using absolute time paging can help to guarantee the timing synchronization, if paging occasion is calculated based on the actual time, e.g., wall time. If the timing is synchronized between the network and the UE, the chance that the UE wakes up at wrong timing after a long sleep can be reduced. For example, during ATP in step 631, the UE goes to deep sleep, and then wakes up from a very long power-saving paging cycle according to a predefined timing (e.g., certain subframe(s)) based on wall time and thereby monitoring a paging channel.

Figure 7:
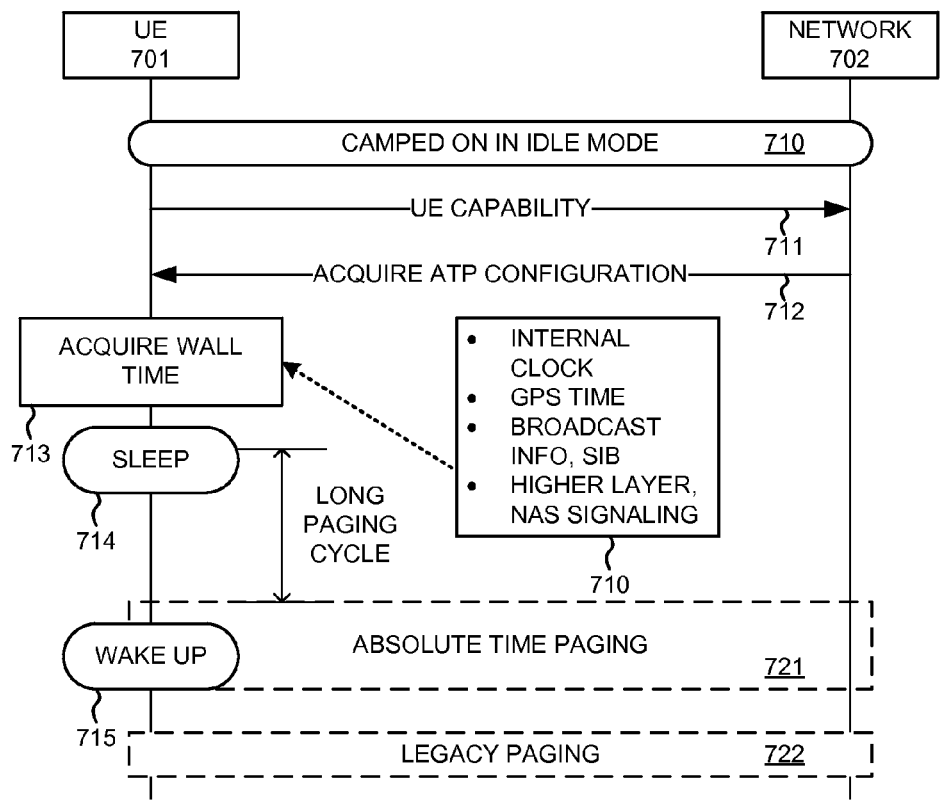
FIG. 7 illustrates a signaling sequence chart between a UE and network for supporting absolute time paging mechanism.

FIG. 7 illustrates a signaling sequence chart between UE 701 and network 702 for supporting absolute time paging mechanism. In step 710, UE 701 is camped on a cell in normal idle mode. In step 711, UE 701 provides UE capability and requirement to network 701. For example, the UE capability indicates the wall time availability of the UE, and the UE requirement indicates the need for super long paging cycle. In step 712, UE 701 acquires ATP configuration from the network 702. The ATP configuration is based on the UE capability and requirement. For example, the ATP configuration is the timing based on wall time, e.g., Coordinated Universal Time, or any other format for timing. Once UE 701 is configured for ATP, a predefined requirement for timing synchronization shall be defined. For example, the UE shall acquire the wall time at least once in a predefined duration. Alternatively, the UE shall guarantee that the timing drift is within a predefined value, e.g., one second.

In step 713, UE 701 acquires wall time. As depicted by list 710, the wall time may be acquired via different means. For example, UE 701 may acquire the wall time from its internal clock, from GPS time, from system information (e.g., SIB) broadcasted by the network, or from high layer (e.g., NAS signaling from MME). In step 714, UE 701 goes to deep sleep for a long paging cycle. In step 715, UE 701 wakes up from the long paging cycle and performs ATP if ATP is configured and the ATP condition is satisfied (step 721). That is, UE 701 wakes up according to a predefined timing based on wall time. After wake up, UE 701 applies legacy paging (step 722). Alternatively, if ATP is not configured or the ATP condition is not satisfied, UE 701 performs legacy paging in normal idle mode (step 722). In one specific example, UE 701 may enter deep sleep from normal idle mode if a condition is satisfied, e.g., a timer has expired or the number of normal paging counts has reached a predefined threshold value.

Figure 8:
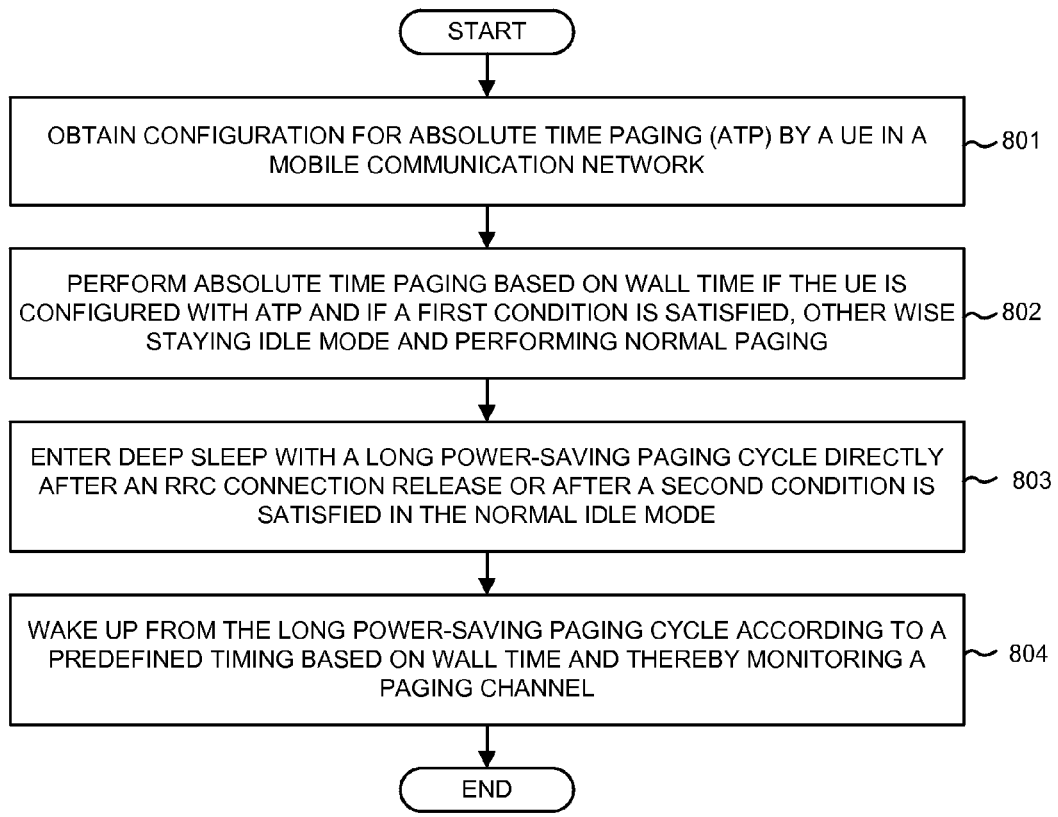
FIG. 8 is a flow chart of a method for absolute time paging in accordance with one novel aspect.

FIG. 8 is a flow chart of a method for absolute time paging in accordance with one novel aspect. In step 801, a UE obtains configuration for absolute time paging in a mobile communication network. The configuration is based on UE capability of availability for wall time and UE requirement related to long paging cycle. In step 802, the UE performs absolute time paging based on wall time if the UE is configured with ATP and if a first condition is satisfied. Otherwise, the UE stays in normal idle mode and performs normal paging. In step 803, the UE enters deep sleep with a long power-saving paging cycle directly after an RRC connection release or after a second condition is satisfied in normal idle mode. In step 804, the UE wakes up from the long power-saving paging cycle according to a predefined timing based on wall time and monitors a paging channel.

Another paging enhancement mechanism is to extend UE wakeup time after a long paging cycle. The extended wakeup time can help UE to go through longer preparation, and allows more flexibility on MME paging request and reduces the chance of missing paging and packet delay. In principle, to extend UE wakeup time, a UE can be configured with two different paging cycles. For example, a UE can be configured with both a normal paging cycle and a long power-saving paging cycle. When the UE wakes up after the long paging cycle, the UE can monitor paging for several normal paging cycles. Until certain condition is met, the UE goes back to the long paging cycle again for power saving purpose.

Figure 9:
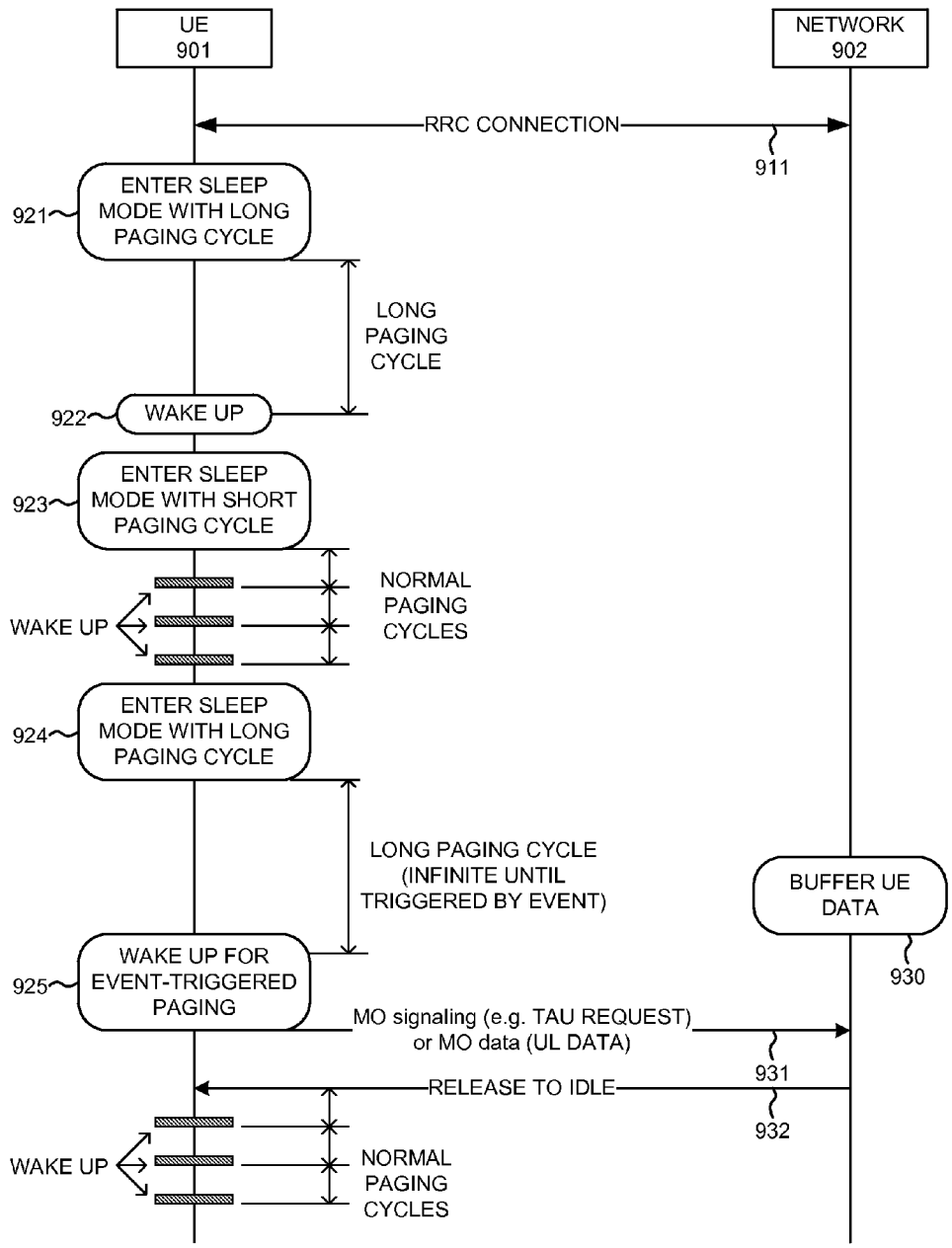
FIG. 9 illustrates a signaling sequence chart between a UE and network for supporting enhanced paging mechanism with extended wakeup time.

FIG. 9 illustrates a signaling sequence chart between UE 901 and network 902 for supporting enhanced paging mechanism with extended wakeup time. In step 911, UE 901 establishes an RRC connection with network 902 in connected mode. UE 901 is configured with a normal paging cycle and optionally a long power-saving paging cycle. In step 921, after an RRC connection release, UE 901 enters deep sleep mode with the long power-saving paging cycle after the UE stays in normal idle for a predefined duration. In step 922, UE 901 wakes up after the long paging cycle. In step 923, UE 901 enters sleep mode with the normal paging cycle. UE wakes up periodically to monitor paging consecutively for several normal paging cycles. In one example, UE 901 starts a timer for the duration of total normal paging cycles. Whenever there is uplink activity (e.g., mobile originated access) or downlink activity (e.g., receiving paging), UE 901 goes to idle mode and restarts the timer. In another example, the number of total normal paging cycles is also configurable. After reaching the maximum number of normal paging cycles, UE 901 goes back to the long power-saving paging cycle again. Alternatively, once UE 901 wakes up from the long paging cycle, UE 901 can stay awake for consecutive paging subframes or a predefined duration. After reaching the maximum number of paging subframe or duration, UE 901 goes back to long paging cycle again. When UE 901 is in deep sleep during the long paging cycle, the UE is considered as power off at AS level and does not perform any idle mode procedure. However, UE 901 still performs access barring related AS functionality.

In step 924, UE 901 enters deep sleep mode with the long power-saving paging cycle. In this example, the long paging cycle length can be infinity, so the UE does not enter short paging cycle until there is an UL triggering event, e.g., TAU or UL traffic. TAU mainly occurs when a UE detects it has entered a new TA that is not in the list of TAIs (Tracking Area Indicators) that the UE registered with the network. TAU also occurs in some other scenarios including when a periodic TA update timer has expired, or when the UE changes its radio capability, etc. If a UE does TAU more frequent than paging monitoring, TAU becomes a bottleneck for UE power saving in idle mode. To avoid frequent wakeup for fast moving UEs, the network can trigger paging upon TAU from the UE. In step 925, UE 901 wakes up for event-trigger paging upon TAU. When UE 901 wakes up for TAU, it then remain awake to monitor paging for several normal paging cycle or a redefined duration. For UE 901 with long paging cycle, when wake up for TAU, UE 901 sends MO signaling (e.g., TAU request) or MO data (UL data) (step 931). UE 901 is then released to idle (step 932). In this way, UE 901 is to be kept longer and the network can forward buffered DL data (in step 930) to UE 901. Note that those data is delay tolerant and the network had to be able to buffer the data for a while. Such mechanism can also apply to any other events that cause UE to wake up. For example, the UE can remain in normal paging cycle after release from uplink data session. After reaching the maximum number of normal paging cycle, the UE then goes to long paging cycle. By switching between the long paging cycle and the normal paging cycle, the UE is able to save power during the long paging cycle, and upon waking up to monitor paging and perform other procedures during multiple normal paging cycles more efficiently.

Figure 10:
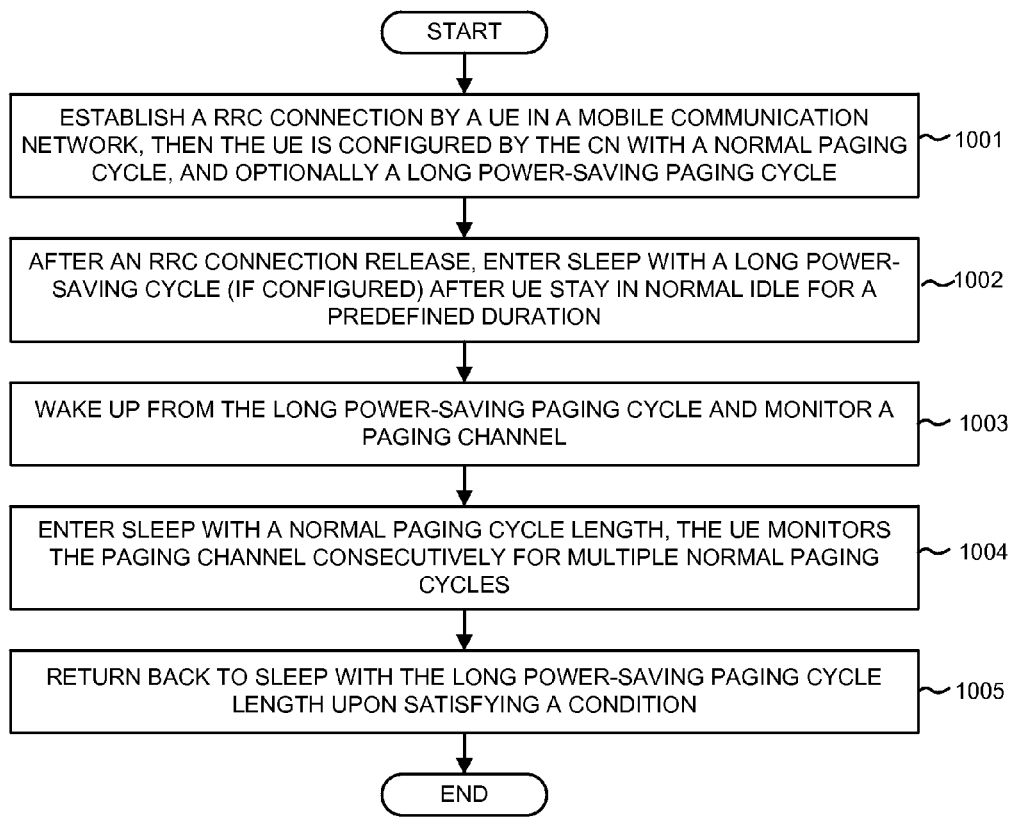
FIG. 10 is a flow chart of a method for enhanced paging with extended wakeup time in accordance with one novel aspect.

FIG. 10 is a flow chart of a method for enhanced paging with extended wakeup time in accordance with one novel aspect. In step 1001, a UE establishes an RRC connection with a serving eNB in a mobile communication network. The UE is configured by the core network with a normal paging cycle, and optionally a long power-saving paging cycle. In step 1002, after an RRC connection release, the UE enters sleep with a long power-saving paging cycle length (if configured) after the UE stays in normal idle for a predefined duration. In step 1003, the UE wakes up from the long power-saving paging cycle and monitors a paging channel. In step 1004, the UE enters sleep with a normal paging cycle length, and the UE monitors the paging channel consecutively for multiple normal paging cycles. In step 1005, the UE returns back to sleep with the long power-saving paging cycle length upon satisfying a condition.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   obtaining configuration for absolute time paging (ATP) by a user equipment (UE) in a mobile communication network;
   performing absolute time paging based on wall time if the UE is configured with ATP and if a first condition is satisfied, otherwise staying in a normal Idle mode and performing normal paging;
   entering deep sleep with a long power-saving paging cycle directly after an RRC connection release or after a second condition is satisfied in the normal Idle mode; and
   waking up from the long power-saving paging cycle according to a predefined timing based on wall time and thereby monitoring a paging channel, wherein the UE wakes up from the long power-saving paging cycle to perform a Tracking Area Update (TAU) procedure.

2. The method of claim 1, wherein the ATP configuration is based on UE capability of wall time availability and UE requirement of the long power-saving paging cycle.

3. The method of claim 1, wherein the wall time is acquired from at least one of an internal UE clock, a GPS time, information broadcasted from the network, or information from a higher layer signaling.

4. The method of claim 1, wherein the first condition comprises a Public Land Mobile Network (PLMN) ID or a tracking area (TA).

5. The method of claim 4, wherein the UE performs PLMN selection, cell selection, or tracking area update (TAU) before performing ATP.

6. The method of claim 1, wherein the second condition comprises a timer or a count of paging occasions.

7. A method, comprising:
   establishing a radio resource control (RRC) connection by a user equipment (UE) in a mobile communication network, wherein the UE is configured with a normal paging cycle and a long power-saving paging cycle;
   entering deep sleep with a long power-saving paging cycle length after the UE stays in normal idle for a predefined duration after an RRC connection release;
   waking up from the long power-saving paging cycle and thereby monitoring a paging channel;
   entering sleep with a normal paging cycle length, wherein the UE monitors the paging channel consecutively for multiple normal paging cycles; and
   returning back to deep sleep with the long power-saving paging cycle length upon satisfying a condition; wherein the UE wakes up from the long power-saving paging cycle only when there is uplink activity or the UE needs to perform an Tracking Area Update (TAU) procedure, and wherein the UE wakes up from the long power-saving paging cycle to send a TAU request to receive buffered downlink data from the network.

8. The method of claim 7, wherein the long power-saving paging cycle length is at least in the magnitude of minutes or more.

9. The method of claim 7, wherein the UE is considered power-off at Access-Stratum (AS) level and does not perform idle mode procedure during the deep sleep of the long power-saving paging cycle.

10. The method of claim 9, The UE still performs access barring related AS functionality.

11. The method of claim 7, wherein the condition comprises a maximum number of the multiple normal paging cycles, and wherein the UE restarts the counting upon uplink or downlink activity.

12. The method of claim 7, wherein the predefined duration comprises a maximum number of the multiple normal paging cycles, and wherein the UE restarts the counting upon uplink or downlink activity.

13. The method of claim 7, wherein the condition comprises a timer, and wherein the UE restarts the timer upon uplink or downlink activity.

14. The method of claim 7, wherein the predefined duration comprises a timer, and wherein the UE restarts the timer upon uplink or downlink activity.

15. The method of claim 7, wherein the long power-saving paging cycle length is infinity.

16. A user equipment (UE), comprising:
   a radio resource control (RRC) module that establishes an RRC connection in a mobile communication network, wherein the UE is configured with a long power-saving paging cycle and a normal paging cycle;
   a sleep-mode control module that enables the UE entering deep sleep with a long power-saving paging cycle length after the UE stays in normal idle for a predefined duration after an RRC connection release, wherein the UE wakes up from the long power-saving paging cycle and thereby monitoring a paging channel; and
   a paging control module that enables the UE entering sleep with a normal paging cycle length and monitors the paging channel consecutively for multiple normal paging cycles, and wherein the UE returns back to deep sleep with the long power-saving paging cycle length upon satisfying a condition, wherein the UE wakes up from the long power-saving paging cycle to send a Tracking Area Update (TAU) request to receive buffered downlink data from the network.

17. The UE of claim 16, wherein the long power-saving paging cycle length is at least in the magnitude of minutes or more.

18. The UE of claim 16, wherein the condition comprises a maximum number of the multiple normal paging cycles, and wherein the UE restarts the counting upon uplink or downlink activity.

19. The UE of claim 16, wherein the predefined duration comprises a maximum number of the multiple normal paging cycles, and wherein the UE restarts the counting upon uplink or downlink activity.

20. The UE of claim 16, wherein the condition comprises a timer, and wherein the UE restarts the timer upon uplink or downlink activity.

21. The UE of claim 16, wherein the predefined duration comprises a timer, and wherein the UE restarts the timer upon uplink or downlink activity.

22. The UE of claim 16, wherein the long power-saving paging cycle length is infinity.

* * * * *